United States Patent Office 3,814,683
Patented June 4, 1974

3,814,683
HYDRODESULFURIZATION PROCESS WITH CATALYSTS WHOSE PORE SIZES ARE CONCENTRATED IN A NARROW RANGE
Robert D. Christman, Pittsburgh, Joel D. McKinney, Indiana, and Geoffrey R. Wilson, Pittsburgh, Pa., assignors to Gulf Research & Development Company, Pittsburgh, Pa.
Filed June 14, 1972, Ser. No. 262,842
Int. Cl. C10g 23/02
U.S. Cl. 208—216
20 Claims

ABSTRACT OF THE DISCLOSURE

A process for the hydrodesulfurization of a crude oil, a reduced crude oil or a heavy gas oil comprising passing said oil and hydrogen over a catalyst comprising supported Group VI and Group VIII metals. The catalyst has a pore volume of at least 0.40 cc./gram with at least 65 percent of the pore volume included within a relatively narrow pore size range as determined by isothermal nitrogen desorption measurement at liquid nitrogen temperatures. The isothermal nitrogen desorption graph for the catalyst shows that the change of volume of nitrogen in the catalyst per unit change in pore radius versus increasing pore radii within said narrow pore size range exhibits at least one peak from which the curve descends and during its descent it reverses direction and reascends, with a descent and reascent magnitude of at least 0.001 milliliters per gram per angstrom unit, to form at least one other peak within said narrow pore size range.

Figure 1A:
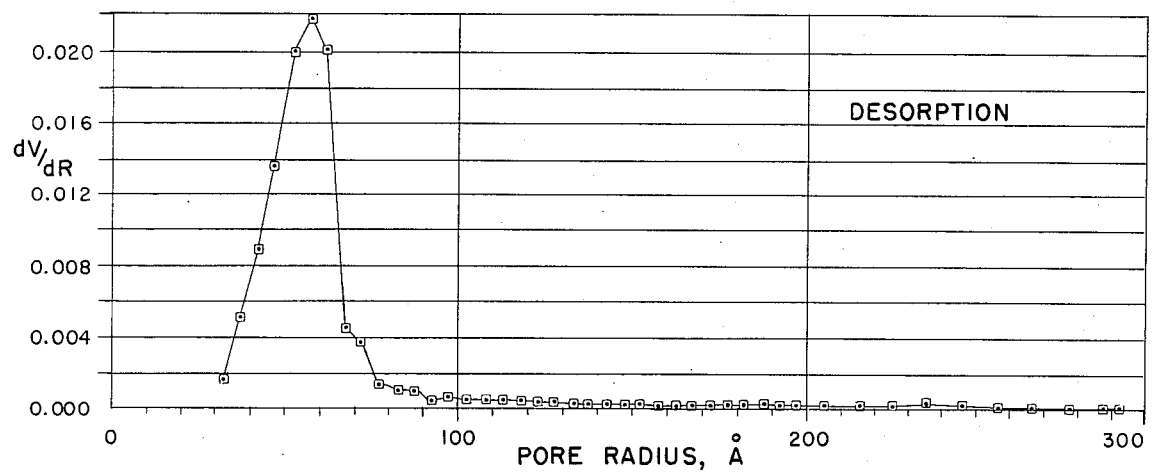

This invention relates to a process for hydrodesulfurization of crude petroleum oil, residual oil or heavy gas oil employing catalysts having a high pore volume wherein a high proportion of the pores are concentrated in a narrow range of relatively large pore sizes as measured by isothermal nitrogen desorption at liquid nitrogen temperatures.

One advantage of concentrating a high proportion of the total pore volume of the catalyst in a desired narrow range of pore sizes is the avoidance of an excessive pore volume in the catalyst. If the total pore volume is too high, the catalyst tends to lose mechanical strength. The catalysts of the present process provide a relatively high pore volume while concentrating the pores in a narrow, desired pore range, thereby tending to omit pores of undesired size and conserving catalyst strength.

A high proportion of the sulfur content of crude and residual petroleum oils is contained in the heavy fractions of the oil, such as the propane-insoluble asphaltene and resin fractions, and to a lesser extent in the heavy gas oil fraction, i.e. a fraction comprising mostly 600 or 650° F.+distillate or a similar boiling range fraction obtained by means other than distillation, e.g., solvent extraction. The hydrodesulfurization process of the present invention is directed towards the removal of sulfur present in these oils in the presence of Group VI and Group VIII metal catalysts supported on a suitable support such as alumina which contains less than 5 percent silica, generally, and preferably less than one percent of silica. If desired, other porous oxides and/or mixed oxide supports can be used, such as alumina-magnesia, silica-magnesia, etc. Preferred catalysts are nickel-molybdenum, cobalt-molybdenum or nickel-cobalt-molybdenum on alumina. Tungsten can replace molybdenum in such combinations. The metal-impregnated supported catalysts have a high pore volume, i.e. a pore volume of at least about 0.4 or at least 0.45 or 0.5 cubic centimeters per gram. This pore volume is made up predominantly of relatively large pore sizes which are particularly adapted for admission of the relatively large size molecules in which the sulfur is concentrated, i.e. the heavy gas oil and residual molecules. Furthermore, it is shown that the pores can be provided with inlet orifice restrictions which are sufficiently large to admit the sulfur-containing molecules but which are small enough to tend to reject the larger metal-containing molecules. The metal-containing molecules are larger than the molecules requiring desulfurization, and are generally the largest molecules contained in a crude oil. They tend to rapidly deactivate the catalyst by depositing metals within the pores if they obtain admittance to the pores. The effect of the size of the orifice of catalyst pores on residual oil desulfurization is shown more fully in a patent application filed on even date herewith entitled, "Residue Hydrodesulfurization Process With Catalysts Whose Pores Have a Small Orifice Size," in the names of R. D. Christman, G. E. Elliott, Jr., J. D. McKinney and G. R. Wilson.

A highly critical feature of the present invention is the method utilized to determine the size of catalyst pores. Catalyst pore size is a function in large part of the temperature, water content and other conditions of calcination used in preparing both the support and the catalyst. In determining catalyst pore size the method of isothermal nitrogen adsorption at liquid nitrogen temperatures is commonly employed. This method measures milliliters of nitrogen (at standard temperature and pressure) adsorbed per gram in terms of relative pressure $P/P_0 \cdot P$ is the pressure at which the gas is adsorbed and $P_0$ is the vapor pressure of the nitrogen at the adsorption temperature. However, it is an important feature of the present invention that the method of nitrogen adsorption to determine pore size distribution cannot be employed by itself, especially in catalysts whose pores have a pronounced orifice, as explained below. Many catalysts of the present invention yield widely dissimilar pore size distribution data when tested at liquid nitrogen temperatures by the method of nitrogen adsorption as compared to the method of nitrogen desorption. The nitrogen adsorption tests tend to indicate a relatively uniform distribution of pores over the entire range of pore sizes in the catalyst, with the most frequent pore size range appearing at deceptively high pore sizes. The nitrogen desorption tests indicate a much less uniform distribution of pore sizes and a relatively high concentration of the total pore volume in a relatively narrow range of relatively smaller pore sizes.

The reason for the disparate results obtained when using the nitrogen adsorption method as compared to the nitrogen desorption method is evidently due to the configuration of the pores. When the pores tend to have a relatively uniform diameter throughout or are below 35 to 40 A. in radius the nitrogen adsorption and desorption methods tend to produce equivalent or comparable results. However, when the pores are above 35 to 40 A. in radius and the shape of the pores deviate from a uniform, cylindrical configuration so that an ink bottle or balloon shape pore configuration becomes manifest with the opening or orifice of the pore at the surface of the catalyst having a relatively narrow neck and the interior main body of the pore being enlarged, the described discrepancy in apparent pore size distribution when employing the adsorption and desorption methods becomes apparent. The discrepancy in the apparent pore size distributions as determined by the adsorption and desorption methods of measurement becomes larger as the body of the pore becomes larger compared to the neck or orifice of the pore.

The differing results obtained between adsorption and desorption pore size methods are accounted for by the fact that during the adsorption portion of the test the nitrogen enters the pores relatively easily upon an increase in relative nitrogen pressure until pore saturation occurs. However, upon reducing relative nitrogen pressure in the subsequent desorption portion of the same test, the nitrogen does not always escape from the pores as easily as it entered so that the amount of nitrogen contained within the catalyst at a given relative pressure of nitrogen in the desorption isotherm portion of the test can be greater than the amount of nitrogen contained in the catalyst at the same nitrogen relative pressure in the adsorption portion of the test. In fact, a residual amount of nitrogen can remain trapped within the catalyst pores even at the conclusion of the desorption portion of the test at zero relative nitrogen pressure at liquid nitrogen temperatures. The narrower that the neck of the pore is relative to the body of the pore the more difficult it is for the nitrogen within a pore to escape during the desorption portion of the isotherm test. On the other hand, if the pore opening were unobstructed by an orifice the liquid nitrogen adsorbed would be able to escape from the pore with the same ease with which it entered the pore, in which case the adsorption and desorption portions of the isotherm test would tend to indicate the same pore size distribution.

Figure 1B:
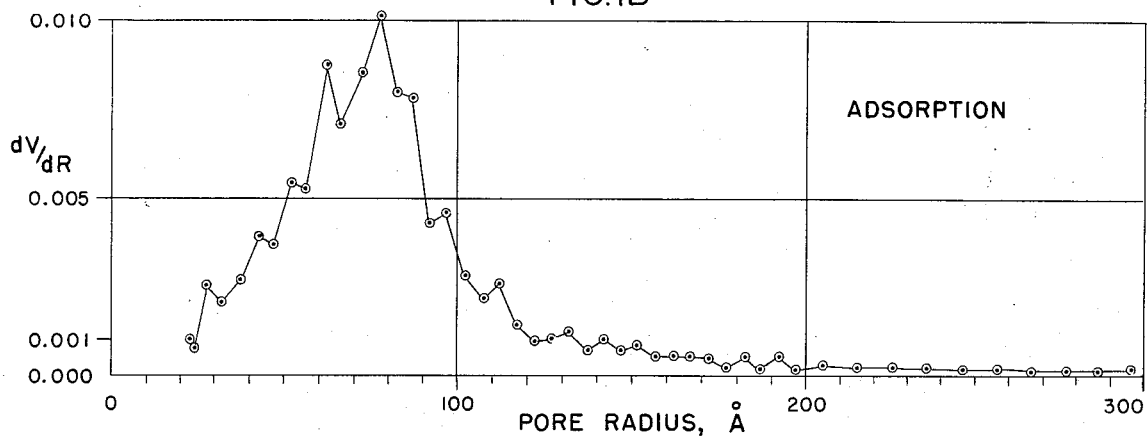
Figure 1C:
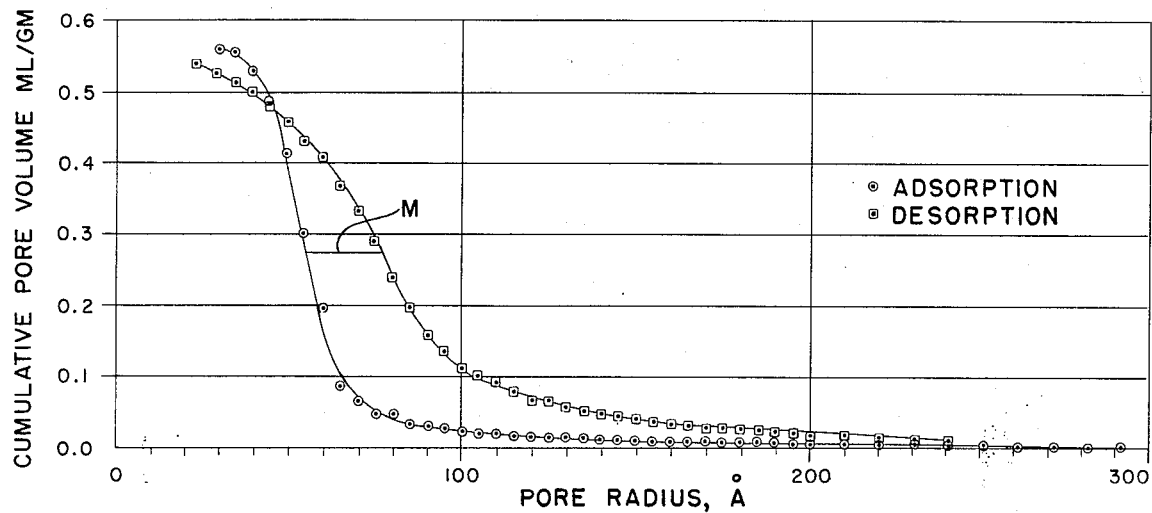

The effects herein described will be more readily apparent by reference to the accompanying figures. FIGS. 1 through 4 show adsorption and desorption data for four different catalysts. FIGS. 1A, 1B and 1C all relate to one catalyst, FIGS. 2A, 2B and 2C all relate to a second catalyst, FIGS. 3A, 3B and 3C all relate to a third catalyst and FIGS. 4A and 4B relate to a fourth catalyst.

Figure 5:
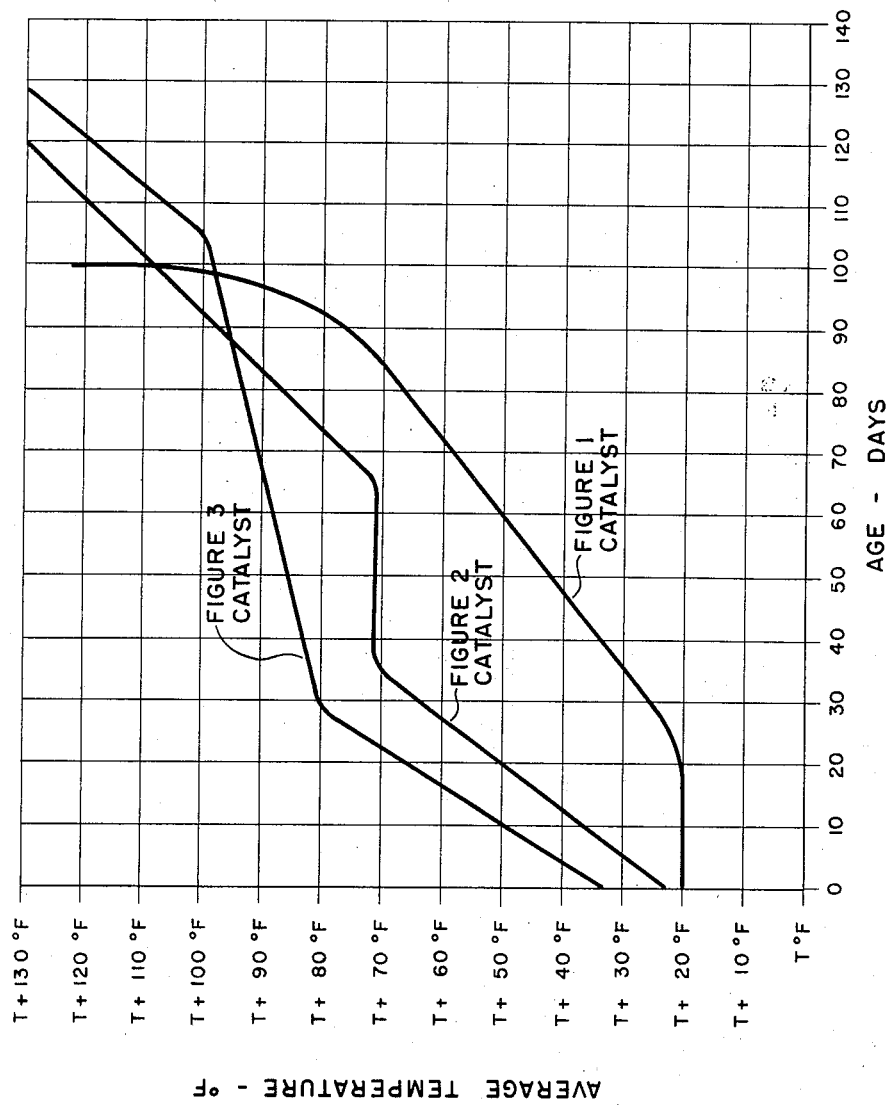

FIG. 5 illustrates the relative activity of the catalysts of FIGS. 1, 2 and 3 for removal of sulfur during residue hydrodesulfurization.

Referring to FIG. 1A, the pore size distribution of the catalyst which is measured during the desorption portion of the isotherm test is illustrated while FIG. 1B illustrates the pore size distribution of the same catalyst during the preceding adsorption portion of the same isotherm test. The adsorption-desorption data reported in the figures were obtained by the use of an Aminco Adsorptomat, Model Number 4-4680. In the groups of FIGS. 1A, 1B, 2A, 2B, 3A, 3B, 4A and 4B the abscissa represents pore radius in Angstrom units and the ordinate represents the change upon variation of pressure in volume of nitrogen in the catalyst in milliliters per gram at a given pore radius and a constant temperature, expressed as $dV/dR$, at each pore radius. Therefore, the units of $dV/dR$ are ml./gm./A. A curve of incremental change of nitrogen volume for each incremental change of pore radius at each pore radius level provides a comparison of the volume occupied by pores of various pore radii. Comparing FIGS. 1A and 1B, it is noted that the greatest concentration of pores appears at a larger pore size in the adsorption portion of the test than in the desorption portion of the test. As explained above, this indicates an ink bottle type of configuration in the catalyst pores making it more difficult for nitrogen to escape from the pores than it was to enter the pores. FIG. 1C shows the milliliters of nitrogen contained in each gram of the catalyst at various pore radii or at various relative nitrogen pressures during the adsorption and desorption portions of the isotherm test. The discrepancy between the two curves in FIG. 1C is referred to as hysteresis. One measure of the magnitude of the difference between the average radius of the neck and body of the catalyst pores is the magnitude of the difference in relative pressure between the adsorption and desorption curves at one-half the total pore volume, as indicated by line M in FIG. 1C.

An important characteristic shown in the desorption curve of FIG. 1A is a relatively uniform or symmetrical arrangement of the curve to illustrate the most frequent pore volume. FIG. 1A shows that in the isothermal desorption test the curve tends to peak at a pore radius of about 57 A. and the curve rises substantially uniformly to this peak and descends substantially uniformly from this peak so that only one peak is apparent. The area under the curve in FIG. 1A is proportional to the pore volume of the catalyst in accordance with the present invention and it is apparent that most of the total pore volume of the catalyst is conconcentrated in the region of the curve encompassed by the ascent to and the descent from the single peak at 57 A.

Figure 2A:
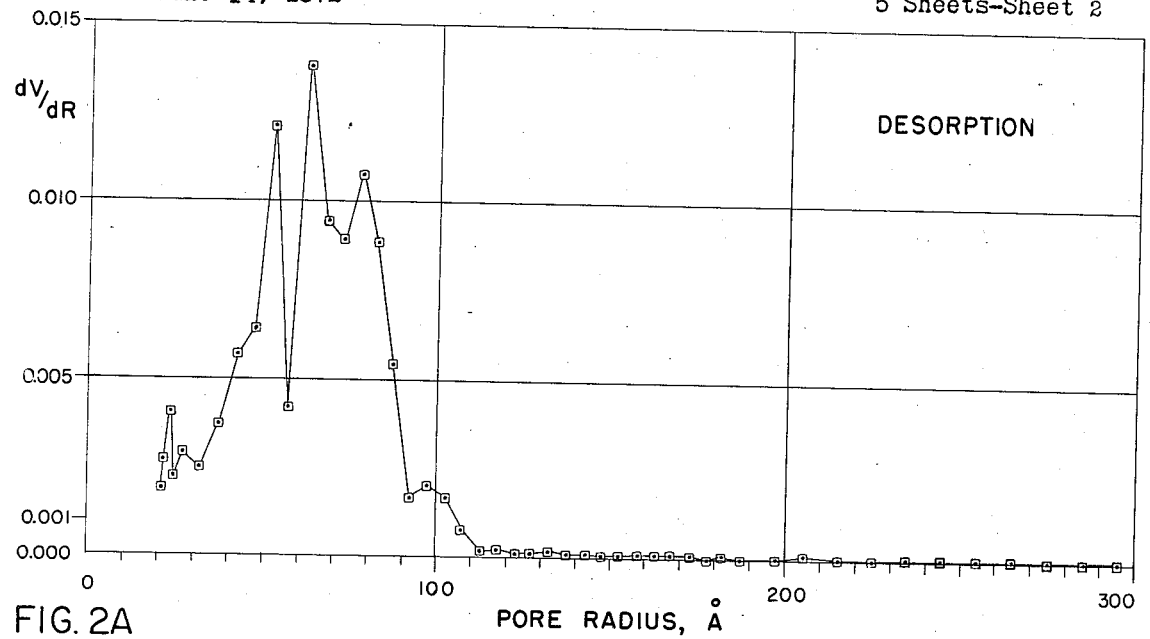
Figure 2B:
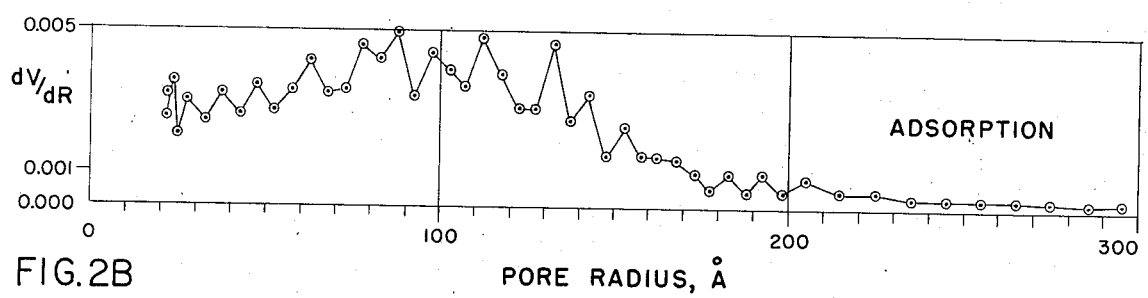
Figure 2C:
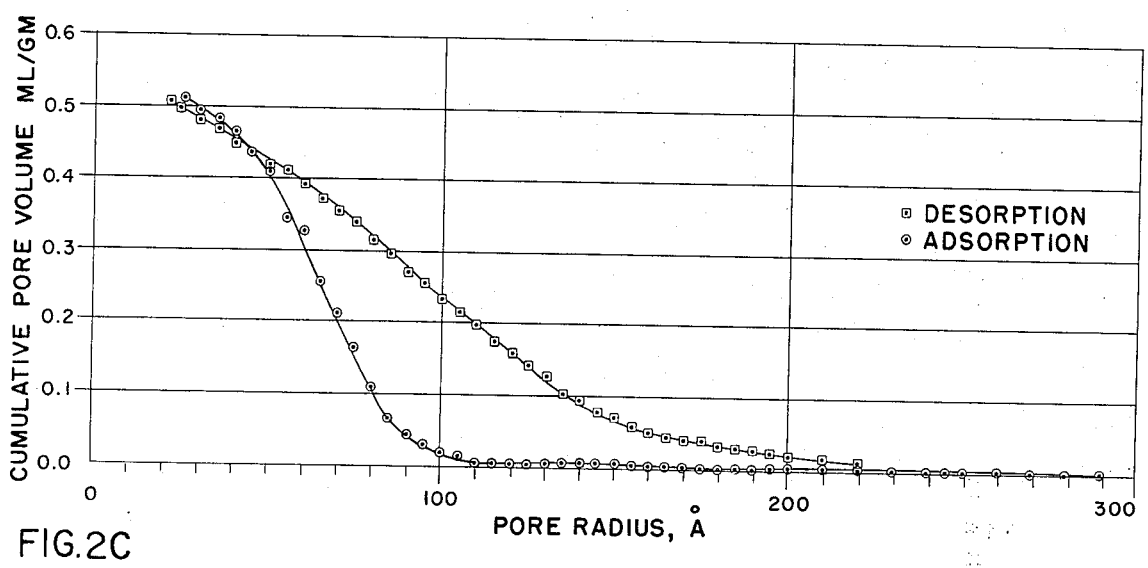

Referring now to the catalyst illustrated in FIGS. 2A, 2B and 2C, a greatly different type of a catalyst pore size distribution curve is evident. For example, FIG. 2B shows that a much more uniform distribution of pore sizes is apparent in the adsorption portion of the isotherm test. However, the ink bottle pore shape characteristic is still evident because a higher average pore radius is apparent in the adsorption portion of the isotherm test (FIG. 2B) than in the desorption portion of the isothherm test (FIG. 2A). But most important, the characteristics of the desorption $dV/dR$ v. R curve is much different in the case of the FIG. 2 catalyst than in the case of the FIG. 1 catalyst. The FIG. 2 catalyst represents a catalyst type of the present invention whereas the FIG. 1 catalyst represents a catalyst type of the prior art. A fundamental difference between the desorption curve of FIG. 2A as compared to the desorption curve of FIG. 1A is that multiple peaks or maxima are apparent in FIG. 2A. The type of maxima referred to is not a numerical magnitude but a mathematical term indicating a reversal of downward slope direction as the curve descends from a peak back to an upwards slope direction towards the formation of another peak in the curve. The downtrend and uptrend of the curve with increasing pore radii before and after reversal of slope direction can be at least 0.001 or 0.002 milliliters per gram per angstrom unit and even 0.003 to 0.005 milliliters per gram per angstrom unit, or more, with the magnitude of the trend in descent and ascent being the same or, more usually, different. However, each is at least 0.001 milliliters per gram per angstrom unit. FIG. 2B shows such reversals in slope direction are frequent in the adsorption isotherm curve but FIG. 2A shows that they are not only relatively infrequent in the desorption isotherm curve but are greatly magnified in the desorption curve. The area under the desorption isotherm curve is a greatly superior indication of useful pore volume than the area under the adsorption isotherm curve. Therefore, the multiple peaks in FIG. 2A tend to enlarge the useful pore volume of the catalyst indicated by the desorption isotherm test by widening the curve which defines the total pore volume. Furthermore, the table presented below shows that the provision of more than a single peak advantageously tends to produce pores of a larger size. The desorption test data of the table show that pores of the FIG. 2 catalyst tends to be concentrated in pores having a larger pore radius as compared to the pores of the catalyst of FIG. 1. Large pores are advantageous in the process of the present invention which is concerned with hydrodesulfurization of relatively large molecules.

Figure 3A:
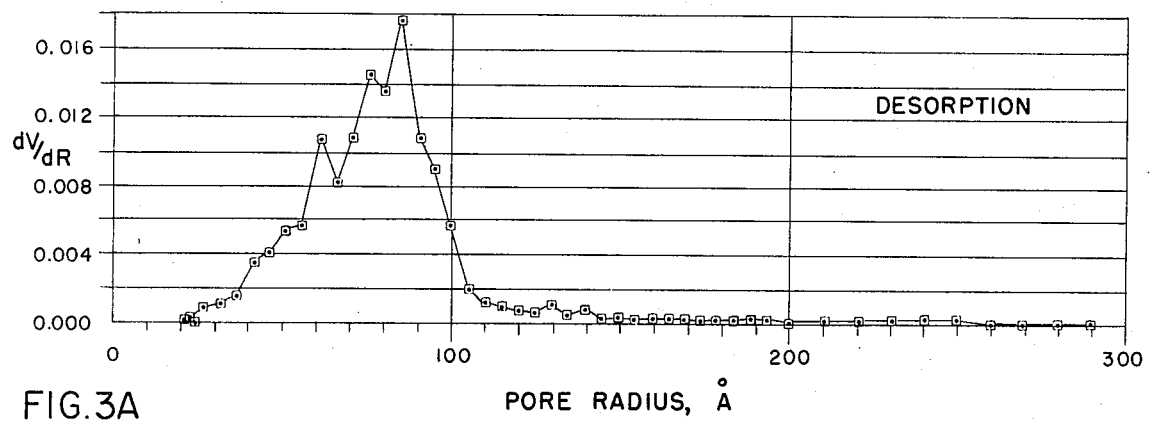
Figure 3B:
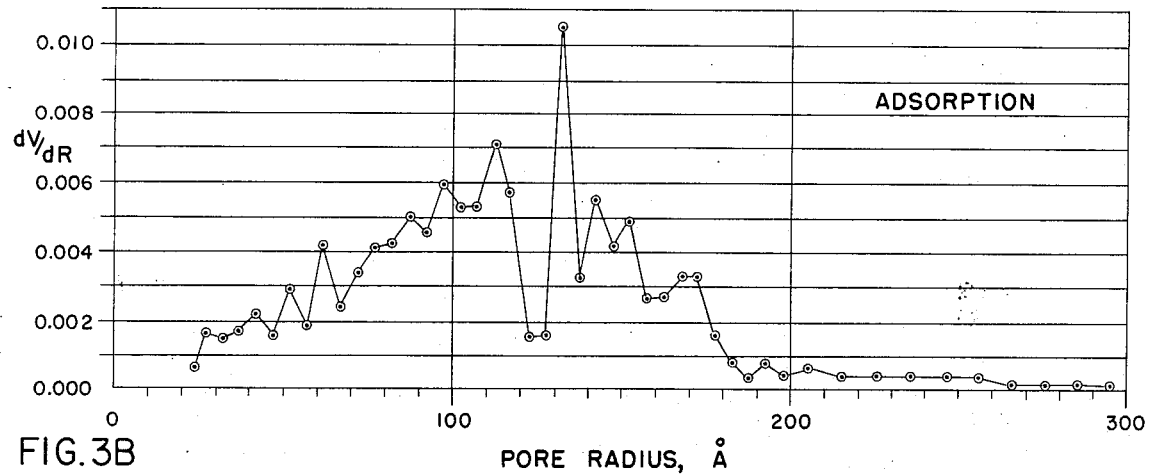
Figure 3C:
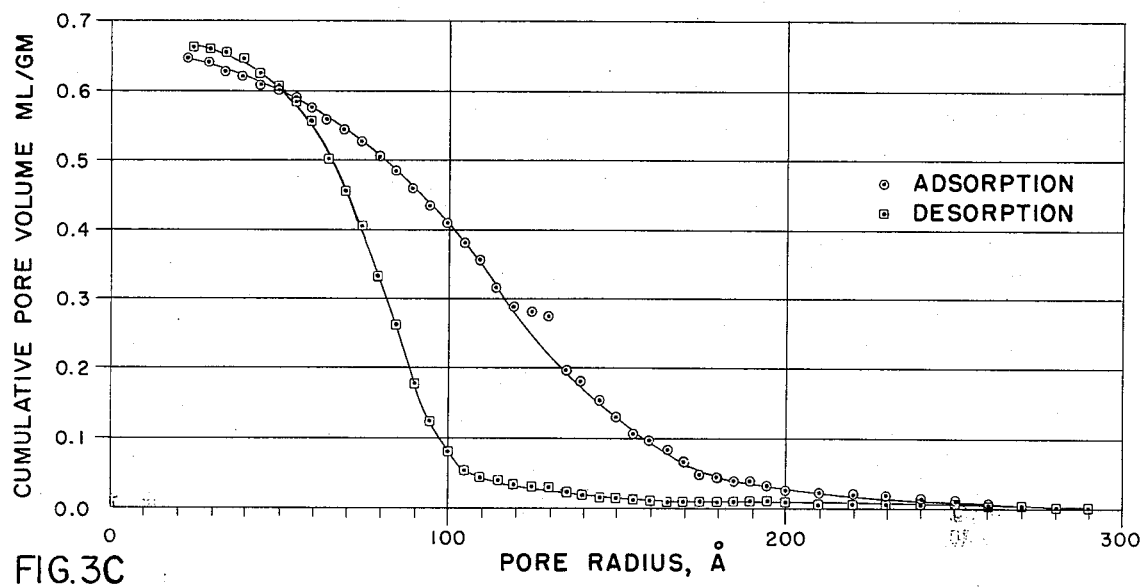

The catalyst of FIG. 3A also exhibits multiple peaks in a catalyst in the desorption curve. The desorption curve of FIG. 3A exhibits a concentration of pores in a narrower range and of relatively smaller pore sizes as compared to the adsorption curve of FIG. 3B.

Figure 4A:
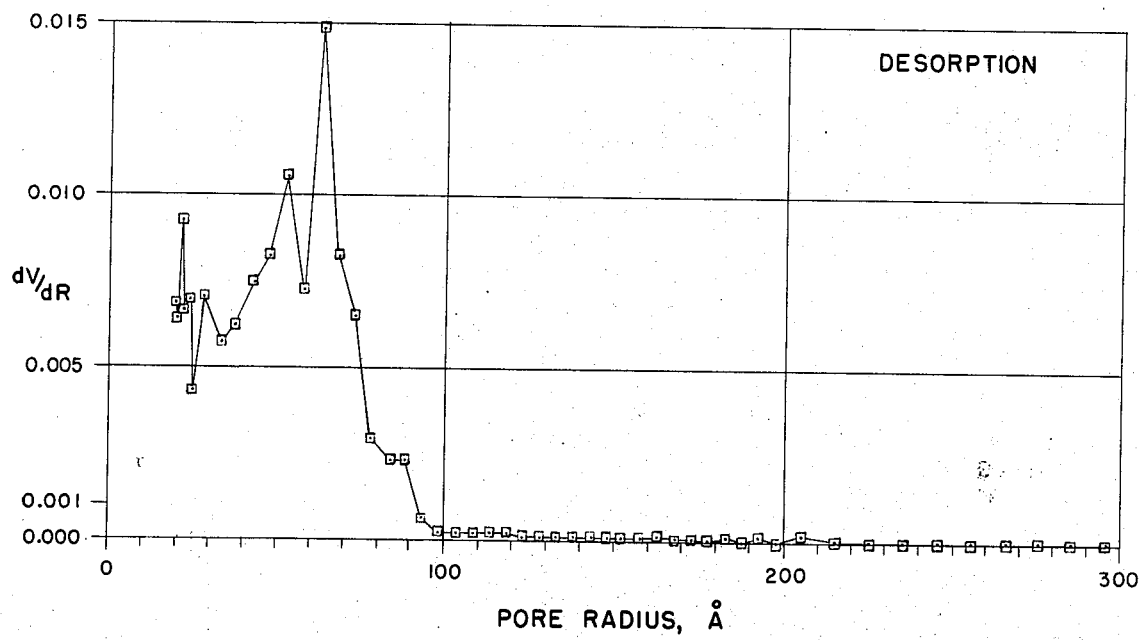
Figure 4B:
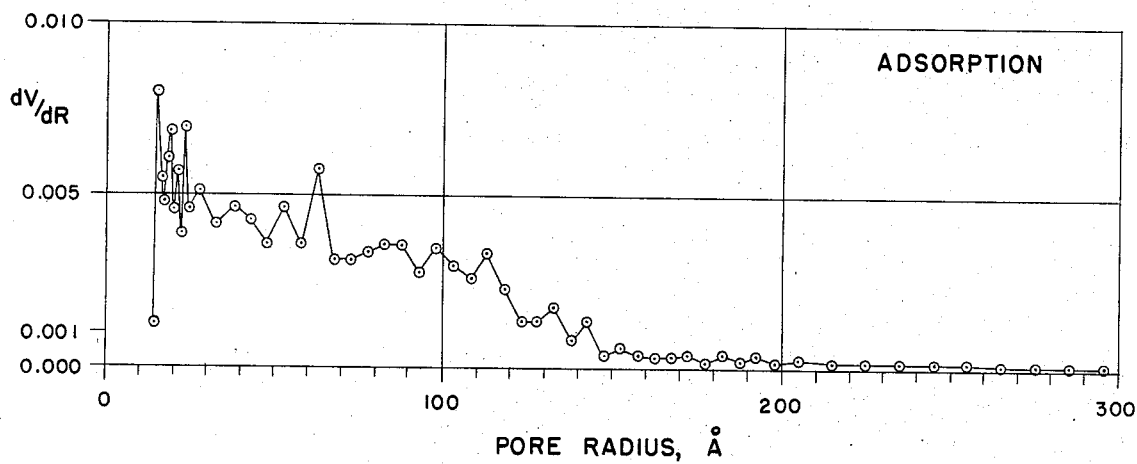

Referring to FIGS. 4A and 4B, another catalyst is shown wherein multiple peaks occur in the desorption portion of the isotherm test. However, the catalyst of FIG. 4 presents a characteristic which is different from the catalysts of FIGS. 1, 2 and 3 in that the pore radii for the peaks in the adsorption portion of the isotherm test tend to more closely concide with the pore radii for the peaks in the desorption portion of the isotherm test. However, this conformity in pore radii is not complete because a comparison of FIGS. 4A and 4B shows that the desorption portion of the isotherm test tends to indicate very little pore volume in pores having a radius above 100 A. whereas the adsorption portion of the test indicates a substantial number of pores of radius above 100 A. Furthermore, again comparing FIGS. 4A and 4B, although the curves in both the adsorption and desorption portions of the tests tend to peak at about the same pore radii in the pore size range below about 100 A., it is noted that the maxima above 35 or 40 A. are not as elevated quantitatively in the adsorption portion of the test as in the desorption portion of the test. Finally, FIG. 4B indicates close to a zero initial nitrogen content in the pores at the lowest pore radii whereas FIG. 4A shows that in the desorption portion of the test at the lowest pore radii significant residual nitrogen remains within the pores which is not removed at liquid nitrogen temperatures. All of these characteristics for the catalyst of FIG. 4 indicate that the ink bottle configuration of the pores is still in evidence, although it is diminished as compared to the catalysts of FIGS. 1, 2 and 3. Therefore, the catalyst pore shape in FIG. 4 more closely approximates a uniform cylinder rather than the pronounced ink bottle configuration in the catalysts of FIGS. 1, 2 and 3. The catalyst type in FIG. 4 is especially suited for use in hydrodesulfurization of heavy gas oils, such as distillates or raffinate, wherein metal-containing compounds are substantially absent, while the catalysts of FIGS. 1, 2 and 3 which have a more pronounced ink bottle configuration, i.e. a highly restricted orifice, are highly suited for hydrodesulfurization of metal-containing residual and crude oils whereby the orifice can block entry into the pores of the large metal-containing molecules. This effect is explained more fully in the aforementioned co-filed patent application.

The table contains detailed physical characteristics data for the catalysts of FIGS. 1, 2, 3 and 4. The data in the table represent the characteristics of fresh catalysts each containing about the same quantity of nickel, cobalt and molybdenum impregnated on an alumina support containing less than one percent of silica. The catalysts used in the tests contain 7.5 to 9.9 weight percent of molybdenum, 1.0 to 1.1 weight percent of cobalt and 0.5 to 0.6 weight percent of nickel, although other amounts of metals could be used with similar results. The metals can be impregnated on the support before or after forming the support with similar results.

contrast, the desorption data for the catalyst of FIG. 2 shows 81.2 percent of the total pore volume is concentrated in the 40 to 90 A. pore size bracket, indicating an upward shift in the radius range above 40 A. required to encompass the same pore volume. The aforementioned multiple peaks occur within the 40 to 90 A. pore size range. The important difference between the multiple peak catalyst of FIG. 2 and the single peak catalyst of FIG. 1 is that the multiple peaks induce a concentration of pores in larger pore sizes. Referring to the catalyst of FIG. 3, the table shows that the multiple peak configuration in that catalyst results in a concentration of 81.5 percent of the total pore volume in the pore size range of 60 to 150 A., indicating a still further upward shift in pore sizes required to encompass about the same percentage of the total pore volume. The aforementioned multiple peaks occur within the 60 to 150 A. pore size.

The catalyst of FIG. 4 illustrates the importance of the relatively large multiple peaks occurring primarily within a range of relatively large pore sizes. The data of the table show that for the catalyst of FIG. 4 barely 70 percent of the pore volume occurs within the 40 to 90 A. range. Comparing the data for the catalyst of FIG. 4 with the catalyst of FIG. 1, there is still an upward shift in pore size concentration within the 40 to 90 A. range for the catalyst of FIG. 4, which is a catalyst of this invention, as compared with the catalyst of FIG. 1, which is not a catalyst of this invention. However, because the catalyst of FIG. 4 exhibits large multiple peaks at pore sizes below 40 A., it has a high concentration of pores below 40 A., which is disadvantageous. This shows that multiple peaking, in whatever pore range it occurs, indicates a heavy concentration of pores in that range.

The data of the table shows that the multiple peaks in the desorption curve advantageously result in catalysts wherein at least 65, 70 or 75 percent of the pore volume tends to be concentrated in a narrow continuous pore size range extending over larger pore sizes as determined by nitrogen desorption, than in the case of a catalyst having a single peak. For example, at least 65, 70 or 75 percent of the total pore volume can be concentrated in a narrow

ADSORPTION-DESORPTION DATA FOR FRESH HDS FINISHED CATALYSTS

|  | Catalyst of Figure 1 | | Catalyst of Figure 2 | | Catalyst of Figure 3 | | Catalyst of Figure 4 | |
|---|---|---|---|---|---|---|---|---|
| Compacted density, g./cc | 0.728 | | 0.736 | | 0.658 | | 0.792 | |
|  | N₂ adsorption | N₂ desorption | N₂ adsorption | N₂ desorption | N₂ adsorption | N₂ desorption | N₂ adsorption | N₂ desorption |
| Surface area, m.²/g | 165.2 | 160.7 | 146.7 | 144.3 | 151.1 | 149.2 | 214.6 | 210.3 |
| Pore volume, cc./g | 0.54 | 0.56 | 0.51 | 0.52 | 0.65 | 0.66 | 0.48 | 0.5 |
| Pore radius, A., avg. pore radius at which ½ total pore vol. is filled with liquid nitrogen | 76.8 | 56.4 | 96.0 | 64.7 | 114.6 | 80.3 | 65.9 | 53.7 |
| 2×10⁴×pore volume/surface area | 65.3 | 69.6 | 69.3 | 72.5 | 85.5 | 89.0 | 45.0 | 43.9 |
| Pore size dist., percent of pore volume: | | | | | | | | |
| 250–300 A. radius | 1.3 | 0.3 | 1.0 | 0.2 | 1.3 | 0.4 | 1.1 | 0.2 |
| 200–250 | 2.4 | 0.6 | 3.7 | 0.4 | 3.3 | 0.7 | 2.3 | 0.4 |
| 150–200 | 4.0 | 1.0 | 10.0 | 0.7 | 16.2 | 1.1 | 3.8 | 0.6 |
| 100–150 | 13.5 | 2.6 | 31.9 | 3.3 | 42.5 | 10.1 | 19.3 | 1.3 |
| 90–100 | 8.3 | 1.0 | 7.3 | 3.6 | 8.1 | 14.8 | 6.5 | 0.9 |
| 80–90 | 14.6 | 1.5 | 8.8 | 13.6 | 7.2 | 23.5 ⎱81.5 | 7.4 | 4.6 |
| 70–80 | 17.2 | 4.7 | 7.7 | 18.7 | 5.8 | 19.0 | 6.8 | 9.3 |
| 60–70 | 14.7 | 23.6 | 7.2 | 22.0 ⎱81.2 | 5.1 | 14.1 ⎰ | 9.3 | 22.8 ⎱69.8 |
| 50–60 | 9.8 | 38.6 ⎱82.4 | 5.9 | 15.4 ⎰ | 3.7 | 8.1 | 8.6 | 17.6 ⎰ |
| 45–45 | 3.5 | 12.3 ⎰ | 3.3 | 6.1 | 1.3 | 3.0 | 3.7 | 8.1 ⎱ |
| 40–45 | 3.6 | 7.9 ⎰ | 2.6 | 5.4 ⎰ | 1.7 | 2.6 | 4.5 | 7.4 ⎰ |
| 35–40 | 2.5 | 4.5 | 3.1 | 3.4 | 1.3 | 1.1 | 4.8 | 6.1 |
| 30–35 | 2.0 | 1.4 | 2.3 | 2.4 | 1.2 | 0.8 | 4.4 | 5.7 |
| 25–30 | 2.3 | 0.0 | 2.9 | 2.8 | 1.2 | 0.6 | 5.4 | 6.9 |
| 20–25 | 0.3 | 0.0 | 2.2 | 2.1 | 0.1 | 0.0 | 5.4 | 6.7 |
| 15–20 | 0.0 | 0.0 | 0.0 | 0.0 | 0.0 | 0.0 | 6.5 | 1.4 |
| 10–15 | 0.0 | 0.0 | 0.0 | 0.0 | 0.0 | 0.0 | 0.2 | 0.0 |
| 7–10 | 0.0 | 0.0 | 0.0 | 0.0 | 0.0 | 0.0 | 0.0 | 0.0 |

The data of the table show an important distinction between the catalyst of FIG. 1, which exhibits a symmetrical single peak in its desorption isotherm test, as compared to the catalysts of FIGS. 2, 3 and 4, each of which show multiple peaks in their desorption isotherm tests. The table shows that for the single peak-type catalyst of FIG. 1, 82.4 percent of the total pore volume is concentrated within a 40 to 70 A. pore size range. In pore size range such as 40 to 90 A., or in a higher pore size range, such as 60 to 150 A. It is important to observe that this characteristic is largely independent of the total pore volume of the catalyst and indicates that by selecting a catalyst of a given pore volume wherein multiple rather than single maxima are evident in the dV/dR v. R curve, a higher concentration of the total pore volume is contained in a narrow pore size range encompassing pores which are of relatively larger size. In addition, the multiple peak characteristic of the catalysts of this invention tend to widen the $dV/dR$ v. R desorption curve and to thereby enclose a greater area under the curve and since the area under this curve is proportional to the total pore volume of the catalyst the multiple peak characteristic tends to indicate a relatively large total pore volume. Therefore, as indicated above, the catalysts of this invention have a pore volume of at least 0.4 cc. per gram, preferably at least 0.45 cc. per gram and most preferably at least 0.5 or 0.55 cc. per gram.

Because the multiple peak catalysts of the present invention exhibit a concentration of at least 65 percent of total pores in a minimum continuous range of pore sizes which represent larger pores than in the case of catalysts having single peaks, these catalysts are particularly suited for the treatment of hydrocarbon feed stocks containing relatively large molecules, such as crude oils and reduced crude oils containing the propane-insoluble resin and asphaltene fractions of the crude, or heavy gas oils, e.g. distillate or raffinate gas oils wherein most of the material has a boiling range above 600 or 650° F.

FIG. 5 shows the results of an accelerated aging study employing the catalysts of FIGS. 1, 2 and 3 in a hydrodesulfurization process employing a 650° F.+residual oil charge at a 4.0 LHSV to reduce the sulfur content of the feed from about a 4 weight percent level to about a 2.4 weight percent level. The tests were made at a total pressure of 2050 p.s.i.g. and the relative temperatures required to maintain a product having a constant level of sulfur were varied as indicated in FIG. 5, with higher temperatures being required with increasing catalyst age.

FIG. 5 shows that the catalysts of FIGS. 2 and 3, possessing a large concentration of pores in larger pore sizes, as compared to the catalyst of FIG. 1, remained active for a longer aging period than the catalyst of FIG. 1. For example, while the catalyst of FIG. 1 reached deactivation temperature after about 100 days, the catalysts of FIGS. 2 and 3 did not reach deactivation temperature until about 120 and 128 days, respectively.

The crude oil or reduced crude oil hydrodesulfurization process of this invention employs conventional reaction conditions such as, for example, a hydrogen partial pressure of 750 to 5000 pounds per square inch, generally, 1000 to 3000 pounds per square inch, preferably, and 1500 to 2500 pounds per square inch most preferably. The gas circulation rate can be between about 2000 and 20,000 standard cubic feet per barrel, generally, or preferably about 3000 to 10,000 standard cubic feet per barrel of gas preferably containing 85 percent or more of hydrogen. The mol ratio of hydrogen to oil can be between about 8:1 and 80:1. Reactor temperatures can range between about 650 and 900° F., generally, and between about 680 and 800° F., preferably. These temperatures are low enough so that not more than about 10, 15 or 20 percent of a residual oil charge is cracked to furnace oil or lighter. The liquid hourly space velocity in each reactor of this invention can be between about 0.2 and 10, generally, between about 0.2 and 1.25, preferably, or between about 0.4 and 1.0 most preferably.

The present invention is particularly directed towards the hydrodesulfurization of a full crude or a residual oil containing substantially the entire asphaltene fraction of the crude from which it is derived and which therefore contains 95 to 99 weight percent or more of the nickel and vanadium content of the full crude. The nickel, vanadium and sulfur content of the liquid charge can very over a wide range. For example, nickel and vanadium can comprise 15 to 1000, generally, or more commonly 20 to 300 parts per million or more of the charge oil while sulfur can comprise about 1 or 2 to 6 or 8 weight percent or more of the charge oil. If a distillate or raffinate oil containing smaller quantities of nickel, vanadium and sulfur is processed, such as heavy gas oil, less severe conditions can be employed. For a heavy gas oil, suitable pressures are 800 to 1500 pounds per square inch, suitable temperatures are 650 to 790° F., and lower gas circulation rates and hydrogen of lower purity than specified above will suffice to remove the least 50, 75 or even 90 percent or more of the sulfur.

A catalyst having the physical properties required for the process of this invention can be obtained from selected batches prepared by reacting ammonium alum crystals with strong aqua ammonia to convert them to alumina. The ammonium sulfate resulting from the reaction is removed by water washing and the alumina is recovered by filtration from the wash liquor. Aluminum hydroxide can also be precipitated from aqueous solutions of aluminum sulfate, aluminum chloride or aluminum nitrate by reaction with a suitable base. Aluminum hydroxide is also prepared by treating sodium aluminate with a mineral acid, such as sulfuric, hydrochloric or nitric acids. The wet alumina filter cake is either dried to the proper consistency or spray dried and reslurried in water to the required consistency and is then extruded into pellets. The alumina is crystalline and is principally boehmite with or without some bayerite. It can also contain some amorphous material. The pellets are dried at about 250° F. and heat treated at 700 to 1300 or 1500° F. for 1 to 24 hours to prepare them for impregnation. The higher the heat treatment temperature the shorter the required time for heat treatment. The calcined alumina will have the physical properties required for the catalyst of this invention and these properties will not be lost during impregnation of the Group VI and Group VIII metals.

Nickel, cobalt and molybdenum can be conveniently impregnated on the alumina in two steps as follows: (1) impregnation of the extruded alumina pellets with ammonium molybdate solution followed by oven drying, and (2) impregnation with a nickel nitrate-cobalt nitrate solution followed by oven drying and calcining.

The ammonium monomolybdate solution is prepared by dissolving ammonium paramolybdate

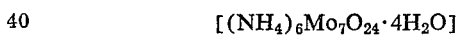

$$[(NH_4)_6Mo_7O_{24} \cdot 4H_2O]$$

in distilled water, with addition of ammonia, and diluting with distilled water. In carrying out the first impregnation, the ammonium monomolybdate solution can be added with stirring to a vessel containing extruded alumina pellets previously dried to 1000° F. in 6 hours and holding at this temperature for 10 hours. The wet material is dried with stirring, at about 250° F., for 24 hours. The composition of the material after the first impregnation is approximately 8.2% molybdenum.

The nickel nitrate-cobalt nitrate solution is prepared by dissolving nickel nitrate $[Ni(NO_3)_2 \cdot 6H_2O]$ and cobalt nitrate $[CO(NO_3)_2 \cdot 6H_2O]$ in distilled water. The second impregnation is carried out in a manner similar to the first impregnation. The wet material is dried at about 250° F. for 24 hours and calcined by heating in air in an electric muffle furnace to 1000° F. in 6 hours and holding at this temperature for about 10 hours. The final composition is approximately 8 percent molybdenum, 1 percent cobalt and 0.5 percent nickel. The catalyst can be presulfided or is sulfided during the hydrodesulfurization process. Impregnation with a single solution of nickel, cobalt and molybdenum salts can also be used.

Although the hydrogenating components indicated above can be employed in any proportions with respect to each other, especially effective catalysts for the purposes of this invention are those in which the hydrogenating component is selected from the group consisting of sulfides and oxides of (a) a combination of about 2 to 40 weight percent, preferably 4 to 16 percent, by weight molybdenum and one or two iron group metals where the iron group metals are present to the extent of 0.2 to 10 weight percent, and (b) a combination of about 5 to 40 percent, preferably 10 to 25 percent, by weight of nickel and tungsten.

We claim:

1. A process for the hydrodesulfurization of a sulfur- and metal-containing oil comprising passing said oil and hydrogen over a catalyst comprising at least one Group VI metal and at least one Group VIII metal on alumina, said catalyst having a pore volume of at least 0.40 cc./gram, said catalyst having a pore body configuration as determined by nitrogen adsorption and nitrogen desorption measuring tests, each of said measuring tests indicating a different pore radius for said configuration, one of said measuring tests determining an average pore radius under isothermal liquid nitrogen adsorption conditions and the other of said measuring tests determining an average pore radius under isothermal liquid nitrogen desorption conditions, said isothermal liquid nitrogen desorption test indicating a relatively greater proportion of said catalyst pore volume in a relatively smaller pore radius range as compared to the isothermal liquid nitrogen adsorption test, said catalyst having at least 65 percent of said pore volume within the average pore radius range of 40 to 90 A. as determined by the isothermal liquid nitrogen desorption measurement, said desorption test showing that the change in volume of liquid nitrogen in the catalyst per unit change in pore radius versus increasing pore radii within said 40 to 90 A. range exhibits at least one peak from which the volume of liquid nitrogen falls with increasing pore radii within said 40 to 90 A. range and increases again to another peak with increasing pore radii within said range, the magnitude of fall and increase within said 40 to 90 A. range being at least 0.001 milliliters of liquid nitrogen per gram of catalyst per angstrom unit so that there are at least two peaks in the desorption isotherm within said 40 to 90 A. range.

2. The process of claim 1 wherein at least 70 percent of the catalyst pore volume is included in said range of 40 to 90 A. in the desorption measurement.

3. The process of claim 1 wherein the catalyst pore volume is at least 0.50 cc./gram.

4. The process of claim 1 wherein said magnitude of fall and increase in pore radii corresponds to a change in volume of liquid nitrogen of at least 0.003 milliliters per gram per angstrom unit.

5. The process of claim 1 wherein said magnitude of fall and increase in pore radii corresponds to a change in volume of liquid nitrogen of at least 0.005 milliliters per gram per angstrom unit.

6. The process of claim 1 wherein the catalyst comprises cobalt and molybdenum.

7. The process of claim 1 wherein the catalyst comprises nickel and molybdenum.

8. The process of claim 1 wherein the catalyst comprises nickel, cobalt and molybdenum on alumina.

9. The process of claim 1 wherein said oil comprises crude oil or reduced crude oil.

10. The process of claim 1 wherein said oil comprises heavy gas oil.

11. A process for the hydrodesulfurization of a sulfur- and metal-containing oil comprising passing said oil and hydrogen over a catalyst comprising at least one Group VI metal and at least one Group VIII metal on alumina, said catalyst having a pore volume of at least 0.40 cc./gram, said catalyst having a pore body configuration as determined by nitrogen adsorption and nitrogen desorption measuring tests, each of said measuring tests indicating a different pore radius for said configuration, one of said measuring tests determining an average pore radius under isothermal liquid nitrogen adsorption conditions and the other of said measuring tests determining an average pore radius under isothermal liquid nitrogen desorption conditions, said isothermal liquid nitrogen desorption test indicating a relatively greater proportion of the catalyst pore volume in a relatively smaller pore radius range as compared to the isothermal liquid nitrogen adsorption test, said catalyst having at least 65 percent of the pore volume within the pore radius range of 60 to 150 A. as determined by the isothermal liquid nitrogen desorption measurement, said desorption test showing that the change in volume of liquid nitrogen in the catalyst per unit change in pore radius versus increasing pore radii within said 60 to 150 A. range exhibits at least one peak from which the volume of liquid nitrogen falls with increasing pore radii within said 60 to 150 A. range and increases again to another peak with increasing pore radii within said range, the magnitude of fall and increase within said 60 to 150 A. range being at least 0.001 milliliters of liquid nitrogen per gram of catalyst per angstrom unit so that there are at least two peaks in the desorption isotherm within said 60 to 150 A. range.

12. The process of claim 11 wherein at least 70 percent of the catalyst pore volume is included in said range of 60 to 150 A. in the desorption measurement.

13. The process of claim 11 wherein the catalyst pore volume is at least 0.50 cc./gram.

14. The process of claim 11 wherein said magnitude of fall and increase in pore radii corresponds to a change in volume of liquid nitrogen of at least 0.003 milliliters per gram per angstrom unit.

15. The process of claim 11 wherein said magnitude of fall and increase in pore radii corresponds to a change in volume of liquid nitrogen of at least 0.005 milliliters per gram per angstrom unit.

16. The process of claim 11 wherein the catalyst comprises cobalt and molybdenum.

17. The process of claim 11 wherein the catalyst comprises nickel, cobalt and molybdenum on alumina.

18. The process of claim 11 wherein the catalyst comprises nickel and molybdenum.

19. The process of claim 11 wherein said oil comprises crude oil or reduced crude oil.

20. The process of claim 11 wherein said oil comprises heavy gas oil.

References Cited

UNITED STATES PATENTS

| | | | |
|---|---|---|---|
| 3,471,399 | 10/1969 | O'Hara | 208—216 |
| 3,686,095 | 8/1972 | Coons, Jr. et al. | 208—216 |
| 3,630,888 | 12/1971 | Alpert et al. | 208—216 |
| 3,340,180 | 9/1967 | Beuther et al. | 208—216 |
| 3,714,032 | 1/1973 | Bertolacini et al. | 208—216 |
| 3,594,312 | 7/1971 | Christman et al. | 208—216 |

DELBERT E. GANTZ, Primary Examiner

G. J. CRASANAKIS, Assistant Examiner